Nov. 29, 1932.       R. Z. NOLAN       1,889,372
BALE TYING MECHANISM
Filed May 23, 1930       8 Sheets-Sheet 1

Nov. 29, 1932.  R. Z. NOLAN  1,889,372
BALE TYING MECHANISM
Filed May 23, 1930   8 Sheets-Sheet 4

Inventor
R. Z. Nolan.
By
Lacey & Lacey,
Attorneys Nov. 29, 1932.        R. Z. NOLAN        1,889,372
BALE TYING MECHANISM
Filed May 23, 1930        8 Sheets-Sheet 5

Inventor
R. Z. Nolan.
By Lacey & Lacey,
Attorneys

Nov. 29, 1932.  R. Z. NOLAN  1,889,372
BALE TYING MECHANISM
Filed May 23, 1930   8 Sheets-Sheet 6

Inventor
R. Z. Nolan.
By Lacey & Lacey,
Attorneys

Nov. 29, 1932.  R. Z. NOLAN  1,889,372
BALE TYING MECHANISM
Filed May 23, 1930   8 Sheets-Sheet 8

Inventor

R. Z. Nolan.

By Lacey & Lacey, Attorneys

Patented Nov. 29, 1932

1,889,372

UNITED STATES PATENT OFFICE

RUDOLPH Z. NOLAN, OF GODFREY, ILLINOIS

BALE-TYING MECHANISM

Application filed May 23, 1930. Serial No. 455,068.

The object of this invention is to provide a mechanism whereby baled material may be automatically secured in the baled condition and the operation will continue as long as there is material to be baled and a supply of wire to bind the same. In the accompanying drawings, I have, for convenience, illustrated the invention as applied to a hay-baling press of conventional form, but it will be understood that the invention may be employed for tying bales of straw, paper or any other material which is compressed into bales to be shipped or stored. The present invention provides means operating in unison with the baling plunger whereby baling wires will be carried around a bale of compressed material and will be automatically twisted into retaining loops or ties and then severed so that a completed tie will be secured around a finished bale and wires will be disposed to pass around a succeeding bale, the ends of the latter wires being firmly fastened. The invention also provides means whereby the wire carrying, twisting and cutting mechanism will be housed on the sides of the baling press and operated in proper sequence to carry the wires through the sides of the press into the baling chamber behind a formed bale and then automatically retracted after the bale has been tied, the supply of baling wires being mounted on the sides of the press and means being provided whereby the openings through which the wires are carried into the baling chamber will be automatically closed as the working elements withdraw. The invention is fully illustrated in the accompanying drawings and will be hereinafter described and then particularly defined in the appended claims.

Figure 2:
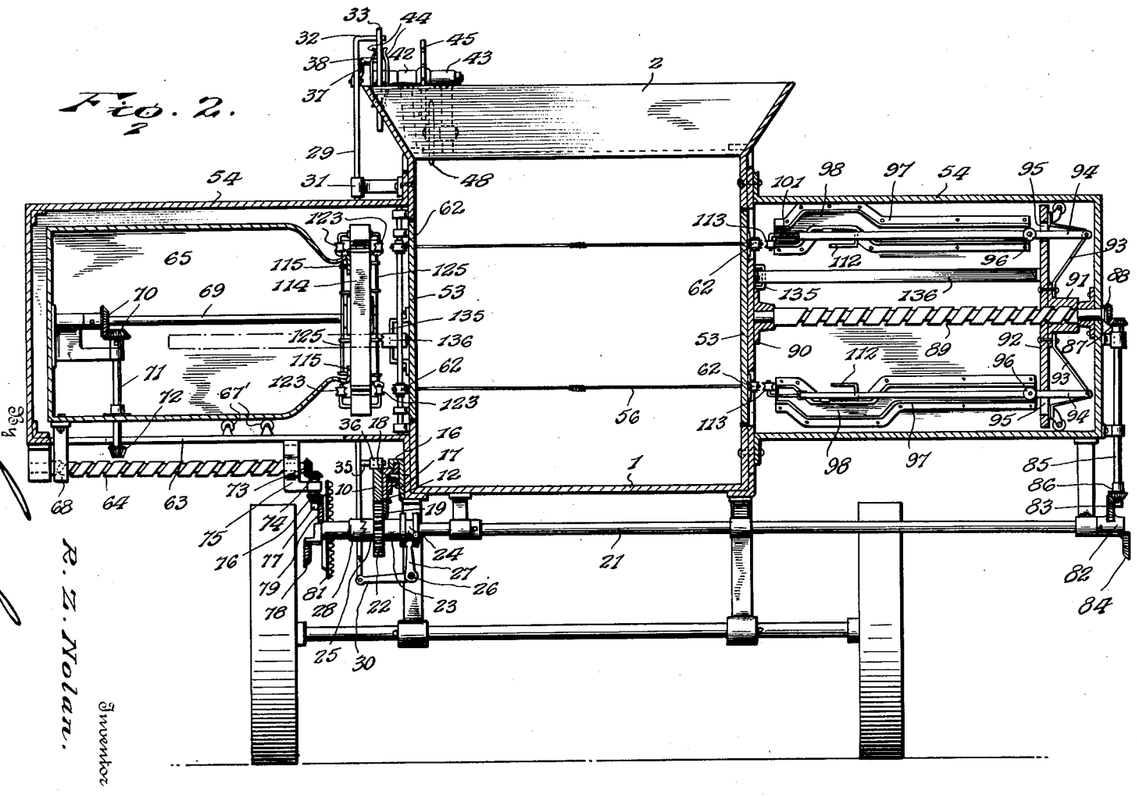
Fig. 2 is a transverse vertical section on the line 2—2 of Fig. 1, the wire-tying devices being shown in position outside the baling chamber.
Figure 3:
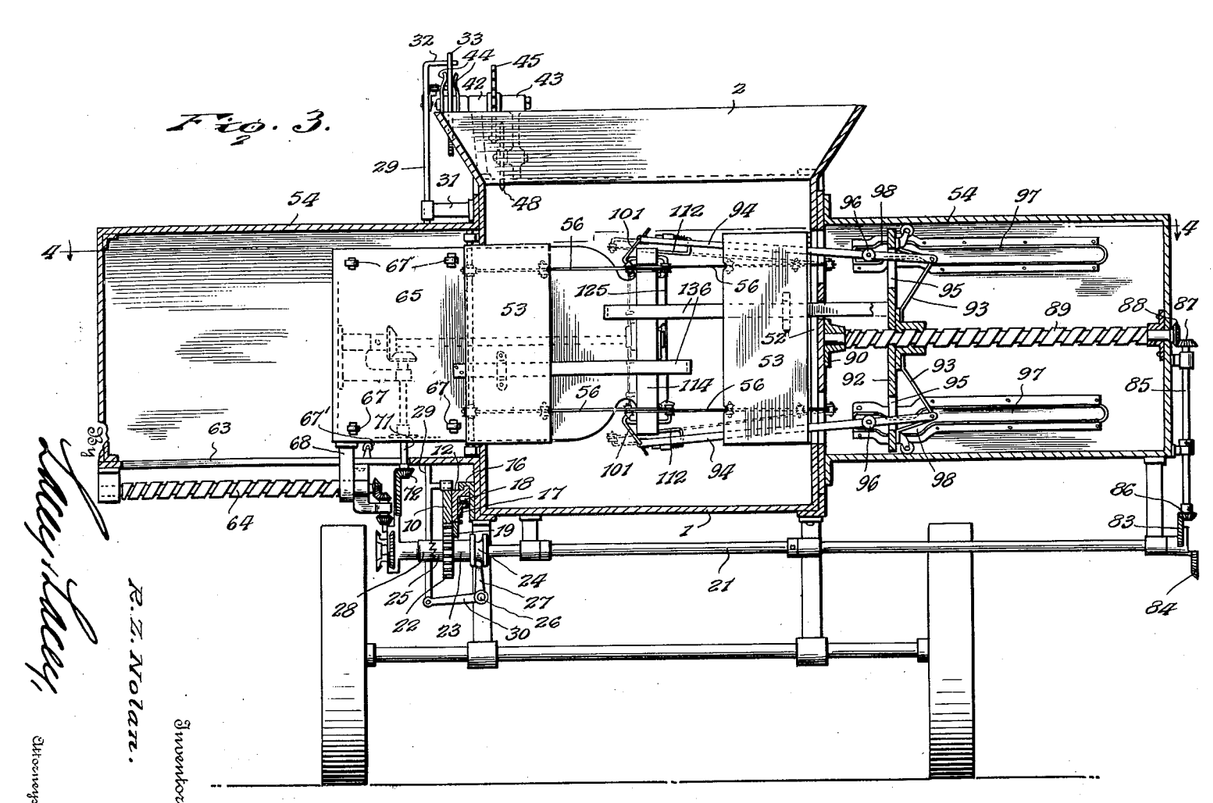
Fig. 3 is a view similar to Fig. 2 but showing the wire-tying devices in position to tie the wires.

The baling press, indicated at 1, may be of any known or approved form and is illustrated as having an ordinary hopper 2 through which the charge of material to be baled is delivered into the compressing chamber, and also equipped with dogs 3 mounted on the sides of the press and adapted to project into the baling chamber and engage behind the formed bale to resist expansion of the same while it is being tied. A plunger 4 is reciprocated within the frame of the press through any convenient or approved mechanism and works against the charge fed through the hopper 2 to compress the same in a well known manner. In carrying out the present invention, a longitudinal slot 5 is formed in the side of the press and a connecting rod 6, disposed alongside the frame of the press, has one end turned up, as shown at 7, and then carried through the slot 5 to be connected with the plunger whereby it will reciprocate in unison therewith, an antifriction roller 8 being preferably provided within the area of the slot to reduce frictional wear between the end of the connecting rod and the sides of the slot, as will be understood. The connecting rod is constructed in two sections or alined members connected by a coupling sleeve 9 which will permit longitudinal adjustment of the sections so that the connecting rod may be elongated or shortened to conform to the stroke of the plunger. The forward section of the connecting rod is formed into a flat blade or bar 10 set on edge and having a rack 11 formed on its lower edge through a substantial portion of its length. This rack bar has secured to its inner side a flange plate 12, the lower edge of which projects below the lower edge of the rack bar, as shown at 13, and the upper edge portion of which is offset inwardly from the rack bar, as shown at 14, and is formed with an upstanding lip 15 along its inner extremity, said lip being engaged in a re-entrant or overhanging flange or guide rail 16 secured to the side of the press immediately at the rear of the flange plate, as shown in the drawings and the purpose of which will presently appear. A track member 17 is secured to the inner side of the flange plate 12 and rollers 18 are disposed on the side of the press between the track 17 and the offset 14, as shown in Figs. 2 and 3, so that the flange plate and the rack bar will be properly supported and guided in their movements. Near the forward end of the flange plate 12, its lower edge portion 13 is cut out and a door 19 is provided to fit within said opening and normally fill the same. The door is held in its closed position by springs arranged to bear thereon and preferably forming a part of the hinge structure so that normally this door will form a part of the flange plate and will lie flush with the outer face of the same. On the upper edge of the rack bar 10 near the forward end thereof is a cam projection or lug 20 which operates a trip device, as will hereinafter appear.

Figure 17:
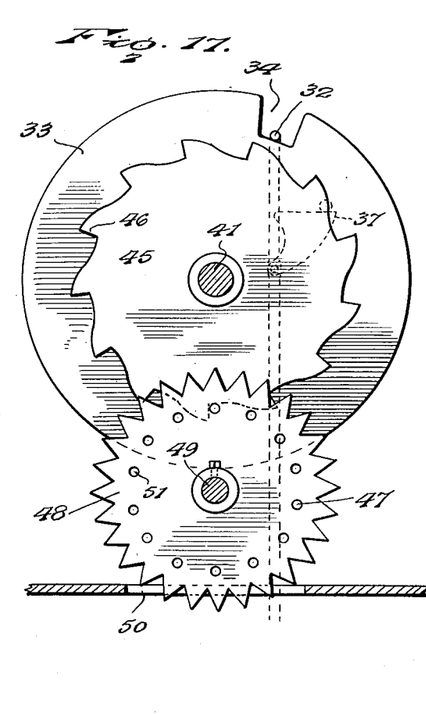
Fig. 17 is a sectional elevation on the line 17—17 of Fig. 16.

Disposed transversely of the baling press and mounted in suitable bearings on the bottom of the same is a shaft 21 and loose upon said shaft is a gear 22 which is adapted to mesh with the rack 11 to be operated thereby and the hub 23 of which is extended inwardly and provided with an annular groove 24 while on its outer side of the hub is formed into a clutch member 25. Mounted in suitable bearings depending from the bottom of the press frame longitudinally thereof is a rock shaft 26, and carried by said rock shaft is an upstanding crank arm 27 which is engaged in the annular groove 24 so that the gear 22 may be shifted into or out of mesh with the rack 11 and also engaged with or released from a clutch member 28 which is fixed upon the shaft 21 whereby, when the gear 22 is in mesh with the rack 11 and being rotated thereby, the rotation will be transmitted to the shaft 21. It may be noted at this point that the gear 22 is rotated and the mechanism of my invention is operated during the return stroke of the plunger after a charge of material has been compressed, and as the plunger reaches the limit of its return stroke the door 19 will be brought opposite the gear 22 which will be then automatically shifted through the opening in the flange 13 to a position behind the door 19 and the flange plate which will then engage the outer side of the gear 22 so that upon the ensuing compressing or working stroke of the plunger the gear will not be rotated and the wire-tying mechanism will be inactive. This inactive state of the wire-tying mechanism will continue while a second bale is being compressed and until the bar 10 and the rack 11 thereon have been carried forwardly beyond the gear, whereupon the gear will be again shifted outwardly to clutch-closing position. The shifting of the gear 22 and the opening and closing of the clutch are accomplished automatically for which purpose a trip rod 29 is disposed vertically at the side of the press and has its lower end pivoted to a crank 30 which is fixed to the rock shaft 26 adjacent the forward end thereof. The trip rod 29 is guided by a bracket 31 secured on the side of the press frame and its upper end is bent inwardly, as shown at 32, to rest upon the periphery of a disk 33 or engage in a notch 34 formed therein. Near the lower end of the trip rod 29 a lateral pin 35 is carried thereby and upon this pin is a roller or sleeve 36 which is adapted to rest upon the upper edgs of the bar 10 and ride on the cam lug 20 in the operation of the device. Near its upper end the trip rod has a dog 37 mounted thereon, the upper end of the dog being somewhat widened, as shown most clearly in Fig. 17, and a stud or pin 38 being provided on the side of the disk 33 to ride on the upper end of the dog, as will be understood upon reference to Figs. 1 and 17, a friction roller or sleeve 39 being preferably mounted on the pin to reduce wear. The disk 33 is mounted loosely upon a sleeve or hub 40 which is secured upon a shaft 41 mounted in suitable supports 42 and 43 secured upon the top of the press, and resilient presser fingers 44 are arranged to bear against the opposite faces of the disk and thereby frictionally hold the same. Secured upon the shaft 41 between the bearing supports 42 and 43 is a wheel 45 having teeth 46 formed upon its periphery and so formed that they may be engaged by pins 47 on the side of a star wheel 48 so that a step by step movement will be imparted to the wheel 45 and the shaft 41. The star wheel 48 is secured upon a stub shaft 49 mounted in the support 43 below the shaft 41 in such position that the star wheel may project through a longitudinal slot 50 in the top of the baling chamber to engage the charge of material which is being compressed and pushed forward by the action of the plunger. It will thus be seen that the star wheel will be actuated whenever a charge is being forced through the baling chamber and the movement of the star wheel in one direction will cause the pins 47 to engage teeth of the disk or wheel 45 and thereby impart a step by step movement to the same while movement of the star wheel in the opposite direction will leave the wheel or disk 45 at rest. By selectively withdrawing some of the pins 47 and inserting pins in the sockets 51 formed in the star wheel, the movement of the ratchet disk 45, and consequently the movement of the shaft 41 and of the disk 33, may be regulated to determine the size of the bale. When the main gear 22 is in mesh with the rack 11 and the shaft 21 is being rotated, the crank 30 and the trip rod 29 are in their lowered positions, the upper hooked end 32 of the trip rod resting in the notch 34 of the disk 33, as shown. As the rack bar nears the rearward limit of its stroke, the lug 20 is carried under the roller 36 and imparts an upward movement thereto thereby lifting the trip rod 29 and exerting a pull upon the crank 30 which rocks the shaft 26 and thereby shifts the gear 22 and its hub 23 inwardly along the shaft 21 so that the gear will be carried to the inner side of the door 19 which will yield to the movement and immediately drop back into position at the outer side of the gear, thereby stopping the operation of the wire feeding and twisting elements. The upward movement imparted to the trip rod will carry its upper end out of the notch 34 and the dog 37, in engagement with the pin or stud 38, will impart a partial rotation to the disk 33 and carry the notch 34 beyond the vertical plane of the trip rod so that the trip rod will rest upon the periphery of the disk and be thereby supported. This movement of the disk will be in the direction opposite to that in which the shaft 41 is rotated through the action of the star wheel 48 and the ratchet disk 45, and will be permitted by reason of the capacity of the disk under applied force to move between the presser fingers 44. During this described movement of the disk 33, the star wheel 48 will remain at rest inasmuch as no charge is being compressed in or moved through the baling chamber, but when the ensuing working stroke of the plunger occurs, the lug 20 will be carried from under the roller 36 so that the trip rod will be free to drop whenever its upper end is cleared from the periphery of the disk. As the charge is compressed and forced from the baling chamber, the star wheel will be rotated in the direction indicated by the arrow in Fig. 1 through its engagement with the compressed material and this action of the star wheel will impart a step by step movement to the ratchet disk or wheel 45, as has been set forth and as will be understood. The presser fingers 44 will rotate with the hub 40 and shaft 41 so that the movement of the star wheel will be transmitted through said fingers to the disk 33 which is frictionally held by the fingers, and eventually this movement will again bring the notch 34 under the end of the trip rod which will thereupon drop to its lower position and cause the gear 22 to be again shifted into clutch-closing position. The movement of the disk 33 caused by the action of the star wheel 48 is, of course, proportionate to the size of the charge and the corresponding stroke of the plunger, and the trip rod cannot drop until the working stroke of the plunger has been completed inasmuch as during said stroke the gear 22 is behind the rack bar and the flange plate and will be held in its innermost position with the clutch open until the stroke has been completed, at which time the end of the rack 11 and the flange plate 13 will clear the gear, as will be obvious upon inspection of the drawings.

Figures 5, 6, 11, 12:
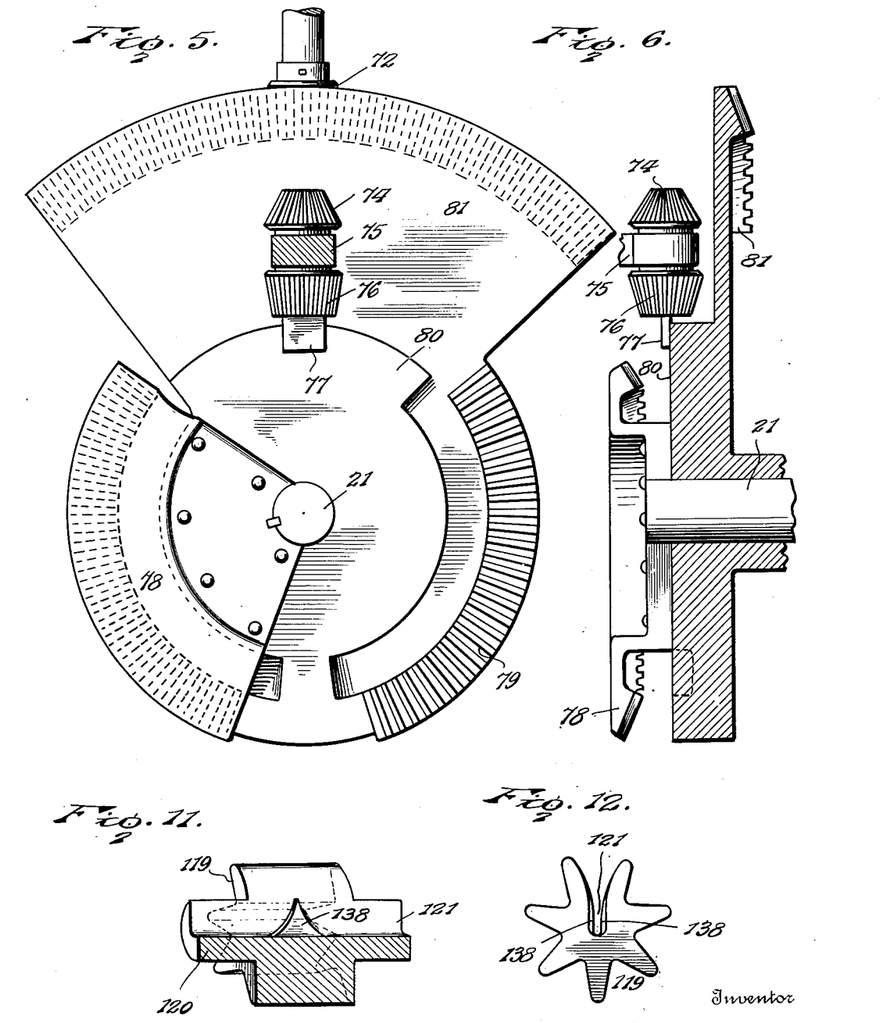
Fig. 5 is a side view of part of the gearing for transmitting the movement of the baling plunger to the wire-operating devices.
Fig. 6 is a sectional elevation of the elements shown in Fig. 5.
Fig. 11 is a longitudinal section through the wire twister.
Fig. 12 is an end view of the twister.

According to the present invention, openings 52 are formed in the sides of the press below the hopper and adjacent the bale-retaining dogs 3 to admit the wire-feeding, twisting and cutting devices, and at the rear sides of these openings doors 53 are mounted in position to swing outwardly and close the openings during the formation of a bale. Alined with the door openings, lateral casings 54 are secured on the sides of the press to house the wire-carrying elements and aid in guiding them as they move into the baling chamber to form a tie and as they are moved therefrom after the tie is formed. These casings or housings 54 may be of any suitable material and are preferably of rectangular form as such form will best accommodate the working parts without occupying excessive space, and they are of such dimensions that they will extend entirely around the door openings and will serve as guards to prevent the doors being damaged by chance blows from passing objects. In the rear side of each casing are openings 55 through which the wires 56 pass to reach the baling chamber, the wires being wound on reels or drums, as shown at 57, which reels or drums are secured upon the sides of the baling press at points between said housings and the area of movement of the connecting rod 6. The drums or reels are provided with tension devices 58 which may be of any approved form and are shown as volute springs so connected to the respective drum and support as to maintain the wires in a taut condition, the feeding of the wires putting the springs under tension so that when the feeding ceases all slack will be taken up. It will be understood that four wires are employed, two wires being mounted on each side of the press and the upper wires being used near the top of the bale while the lower wires are used near the bottom thereof, and, when the operation of the machine is to be initiated, the wires are drawn forward to the limit of the baling chamber and the ends of the two upper wires are united and the ends of the two lower wires are united by being twisted together manually or by the use of any convenient tool, the wires being thus laid in position to receive the first bale which is formed in the press and being extended from the reels or drums longitudinally of the press into the housings 54 across the doors and then within the baling chamber. After the first bale is formed, the tying devices are brought into operation and the wires on the opposite sides of the press are engaged by these devices, carried across the baling chamber, being thereby drawn around the bale, and caused to overlap, and then twisted together, as will be understood upon reference to Fig. 18, in which the completed bale tie is shown at 59 and the wires are shown as brought across the baling chamber to form the beginning of a second tie 60, there being strands of the wires extending longitudinally between the completed and the started ties, as shown at 61. The twisting of the several wires is accomplished simultaneously in finishing the tie 59 and starting the tie 60 and the strands 61 are then severed midway the two ties, whereupon the tension of the wires will cause the severed ends to swing against the completed bale and into position to bear against the side of the next formed bale. The doors 53 are provided on their outer sides with grooved rollers 62 which are engaged by the wires 56 as they pass to the baling chamber so that the wires will be supported and guided until they are engaged by the feeding and tying devices and will always be in proper position to be engaged by said devices. The housing 54 on the left side of the press is constructed with a slot 63 in its bottom which slot extends from a point near the outer end of the housing to a point near the frame of the press, and upon the bottom of said housing a worm shaft or feed screw 64 is mounted directly below said slot. Within the housing a carrier 65 is provided and said carrier may conveniently be in the form of a box open at its inner end. Guiding arms 66 are provided on the several sides of the carrier 65, and these arms are equipped at their ends with rollers 67 engaging the walls of the housing 54 whereby to guide the carrier and permit it to operate smoothly and easily. Additional guiding rollers 67' may be provided on the bottom of the housing, as will be understood. At the outer end of the carrier, a block 68 is secured and depends therefrom through the slot 63, and the lower portion of this block is constructed to engage around the worm 64 and serve as a nut for the same whereby as the worm is rotated the block will be caused to move along the same and thereby effect inward or outward travel of the carrier 65. Mounted within the carrier and extending from the outer end thereof to the inner end thereof is a shaft 69 which is operatively connected through beveled gearing 70 with a vertical shaft 71, the lower end of which extends through the bottom of the carrier and the slot 63 and is equipped with a beveled pinion 72 below the housing 54 and above the worm shaft or screw 64. The inner end of the worm shaft or screw 64 is equipped with a beveled pinion 73 meshing with a similar pinion 74 on the upper end of a short shaft disposed vertically within a right angular bracket 75 which is secured to and depends from the bottom of the housing 54 and supports the inner end of the worm shaft, as will be understood upon reference to Fig. 2. The upper extremity of this bracket 75, where it is secured to the housing, may be forked to permit the passage of the pinion 72 or it may be bent to one side for the same purpose. The shaft which carries the pinion 74 has its lower end portion equipped with a similar beveled pinion 76 and the extremity of the shaft below said pinion is flattened, as shown at 77. Secured to the adjacent end of the shaft 21 is a compound gear which is shown in detail in Figs. 5 and 6 and which is adapted to successively engage the pinion 76 and the pinion 72 so as to effect movement of the carrier 65 into the baling chamber, then operate the wire twisters and cutters, and then effect movement of the carrier from the baling chamber. This compound gear comprises a segment 78 and a segment 79 which are disposed at diametrically opposite points of the gear and are adapted to alternately engage the pinion 76. Between the gears 78 and 79 is a flat surface 80 against which the flat extremity 77 of the pinion-carrying shaft will bear in the intervals between the actions of the segments 78 and 79, and it is to be noted that the segment 78 is offset longitudinally of the shaft from the segment 79 so that the segments will engage the pinion 76 at opposite sides of the same and, consequently, turn it in opposite directions. The gear also includes a larger segment 81 which is concentric with the shaft 21 and other segments but is spaced radially beyond the segments 78 and 79 and is adapted to mesh with the pinion 72 when the latter has been brought into operative position at the inner limit of the travel of the carrier. At the opposite side of the press, the shaft 21 is equipped with a compound gear 82 comprising oppositely disposed segments 83 and 84, corresponding to the segments 78 and 79, but is not provided with a larger segment corresponding to the segment 81. On the outer end of the adjacent right hand housing 54 is mounted a vertical shaft 85 having a beveled pinion 86 at its lower end which is adapted to be engaged alternately by the segments 83 and 84 so that the shaft 85 will be alternately rotated in opposite directions. The upper end of the shaft 85 is equipped with a beveled pinion 87 meshing with a similar pinion 88 on the outer end of a worm shaft or feed screw 89 which is mounted in bearings provided therefor in the outer end of the right hand housing 54 and on a suitable support 90 at the inner end of said housing. This worm shaft or feed screw 89 has working engagement within a sleeve nut 91 at the center of a follower 92 disposed within the housing and it will thus be seen that through the action of the described gearing said follower will be caused to move alternately inwardly and outwardly within the housing.

Figure 13:
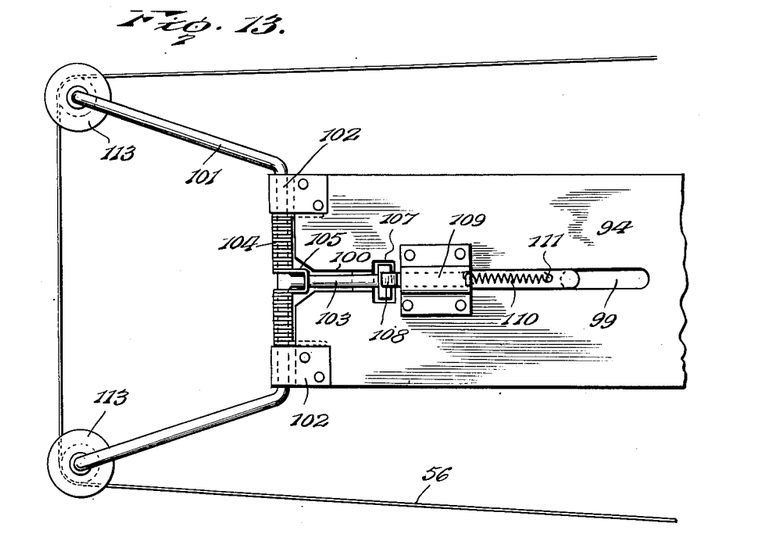
Fig. 13 is a plan view of one of the wire carriers.
Figure 14:
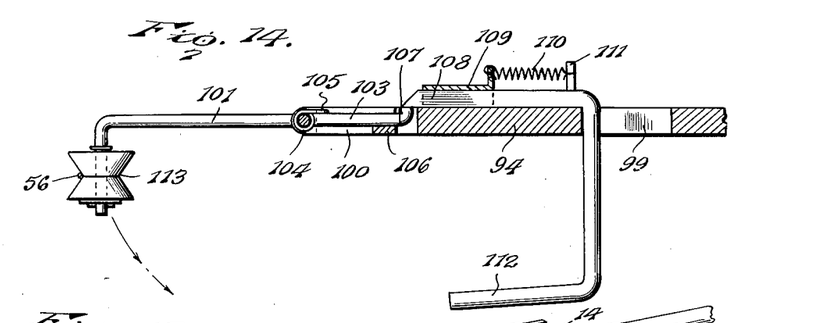
Fig. 14 is a view of the same, partly in side elevation and partly in longitudinal section.
Figure 15:
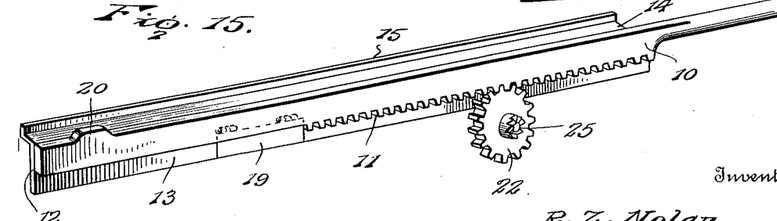
Fig. 15 is a detail perspective view of the actuating rack which is driven directly by the baling plunger.
Figure 16:
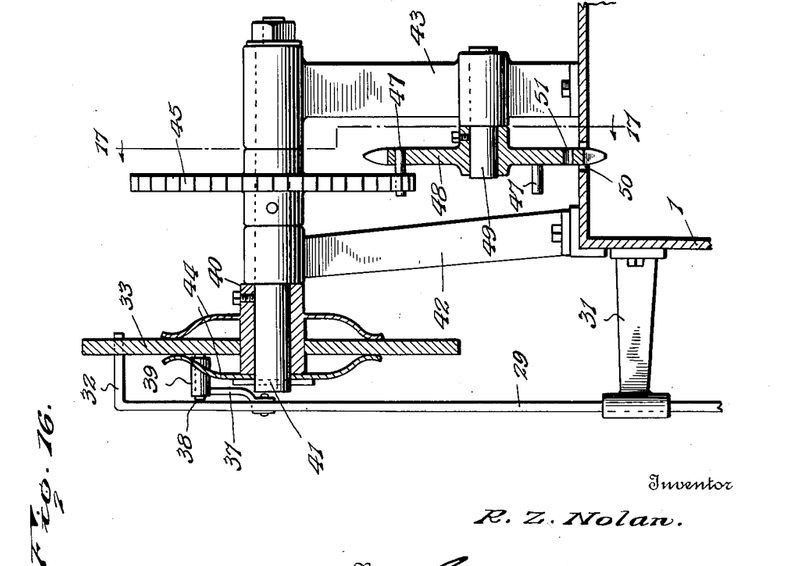
Fig. 16 is a sectional elevation of the trip mechanism.

On the outer side of the follower 92 are brackets 93 to which are pivoted arms 94 which extend inwardly through openings 95 provided therefor in the follower and are equipped on their sides with rollers 96 engaged in and adapted to travel along the tracks 97 provided on the side walls of the housing, said tracks being provided adjacent their inner ends with offset portions 98 whereby as the follower and the arms 94 approach the inner limit of their movement the arms will be given a vertical rocking movement to clear the head carrying the twisters and cutters which will have been simultaneously caused to enter the baling chamber from the opposite side thereof. It will be noted that the offset portions of the upper tracks are bowed upwardly while the offset portions of the lower tracks are bowed downwardly so that the arms cooperating therewith will be respectively rocked to clear the upper and the lower end of the twister and cutter head. The arms 94, as shown clearly in Figs. 13 and 14, are flat plates provided with slots 99 adjacent their inner free ends and with openings or notches 100 at their inner ends at the center of the same. Pivotally mounted at the free end of each arm 94 is a wire carrier and guide consisting of a bail 101, the cross portion or shoulder of which is mounted in the eyes or loops 102 at the end of the arm and is provided with an extension 103 fitting within the slot 100. A torsion spring 104 is coiled around the shouldered portion of the bail and has its ends engaged with the under side of the arm 94 and its central portion extended laterally, as shown at 105, and bearing upon the extension 103 whereby the extension will be normally held within the slot and resting upon a stop 106 which bridges the slot so that the ends of the bail will be held in a plane parallel with the plane of the arm 94. The inner extremity of the extension 103 is preferably widened, as shown at 107, and a latch or bolt 108 normally projects over said widened extremity. The bolt is slidably mounted upon the arm 94 within a guiding housing 109 and is yieldably held in engagement with the extension by a retractile spring 110 having one end attached to the housing 109 and its opposite end attached to a lug 111 on the bolt. The outer portion of the bolt is carried downwardly through the slot 99 and below the arm 94 is extended forwardly, as shown at 112, whereby it constitutes a trigger adapted to engage the cutter and twister head and be thereby slit backwardly so as to release the extension 103 in an obvious manner. The ends of the bail 101 are equipped with grooved rollers 113 which, as the devices are carried inward, will engage the wires 56 disposed in their paths and will thereby take up the wires and support the same, as shown in Fig. 13, and carry them inwardly to meet and overlap the wires brought from the opposite side, and it will be noted that the trigger members 112 are disposed below the upper arm 94 but above the lower arm 94 so that the desired movements of the bail and the wires engaged therewith will be had.

Figures 7, 10:
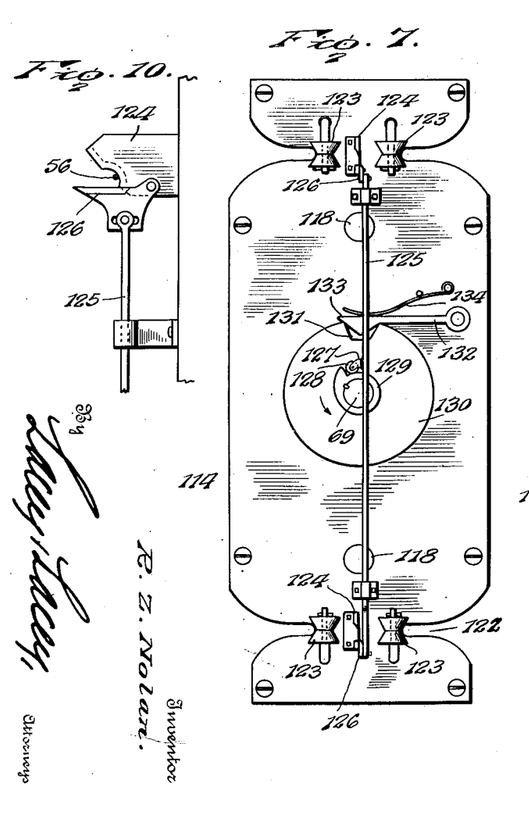
Fig. 7 is a face view of the wire carrier and twisting head.
Fig. 10 is a detail view of the wire cutter.
Figure 8:
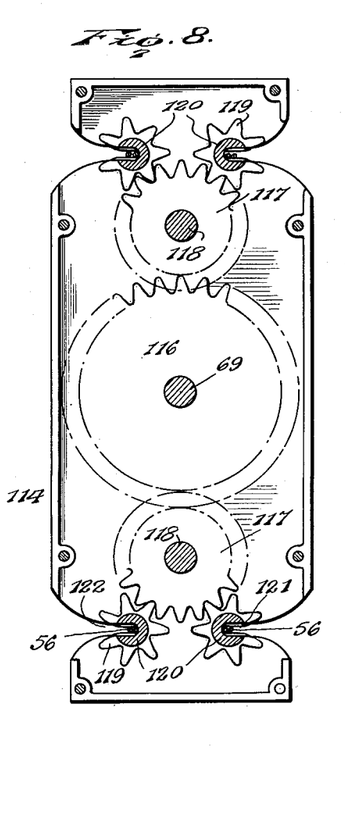
Fig. 8 is a vertical section of the same.
Figure 9:
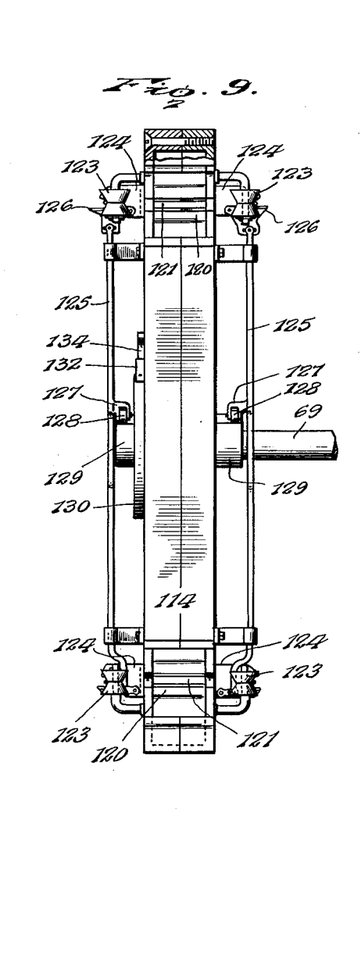
Fig. 9 is an edge view thereof partly in section.

At the inner open end of the carrier 65 is a head 114 which, as will be understood upon reference to Figs. 7, 8 and 9, consists of two counter-part casing members which are secured together and form a hollow body or casing which receives the front end of the shaft 69, the head being secured to the front end of the carrier, as indicated at 115 in Fig. 2, whereby it will be held against rotation and will be carried inwardly or outwardly with the carrier. Within the head, a gear 116 is secured upon the shaft 69 and this gear meshes with smaller gears or pinions 117 secured upon short shafts 118 mounted in the walls of the head adjacent the upper and lower ends of the same. Each gear or pinion 117 meshes with teeth 119 formed on twister heads or spools 120 so that as the shaft 69 is rotated the movement will be transmitted to the twister spools and said spools will be rotated so that the wires engaged therein will be wrapped around each other. Upon referring to Figs. 11 and 12, it will be noted that the twister spools or heads consist of elongated members each having a radial slot 121 formed in one side to receive the overlapped wires 56. The slots 121, when the pinions are at rest, will present their open sides to the notches 122, formed in the casing or head 114, so that as the head moves into the baling chamber the wires will be engaged by the notches 122 and thence pass into the slots or grooves 121 of the twisters. The bases of the grooves or slots 121 are at one side of the centers of the respective twisters and the width thereof is such that the overlapped wires will rest snugly therein. Consequently, as the twisters rotate, the wires will be wrapped around each other and will form the twist or joint or tie shown in Fig. 18.

Figure 4:
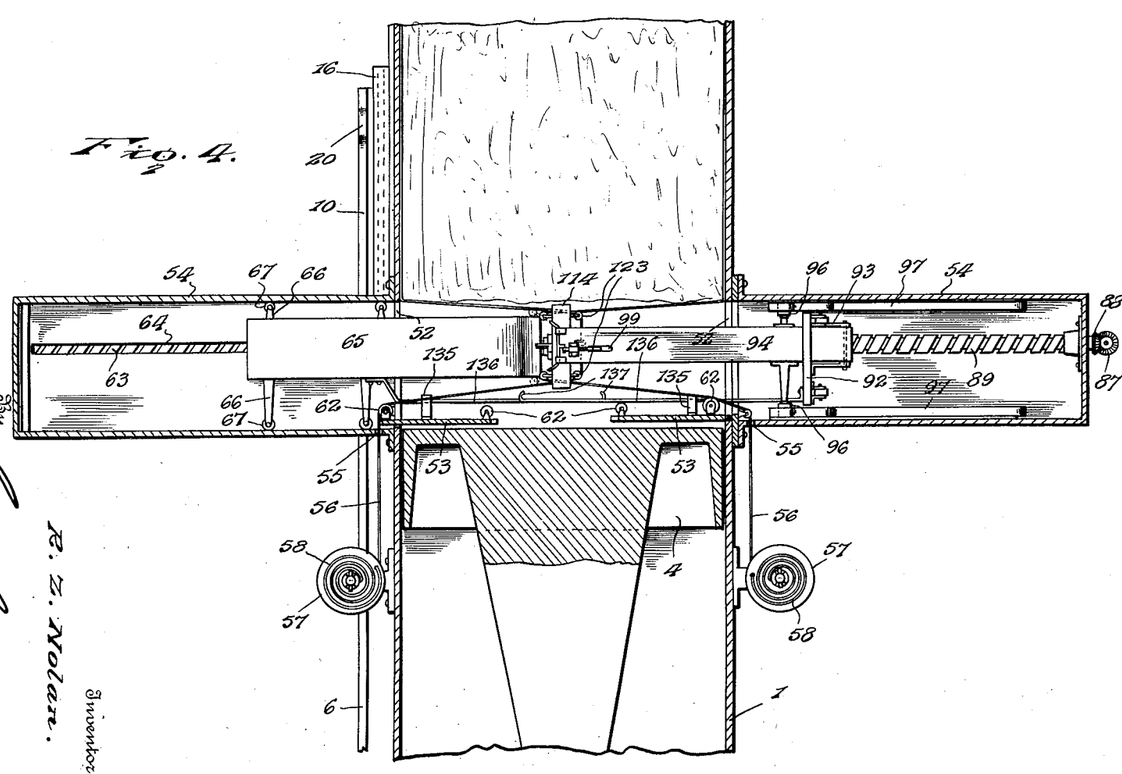
Fig. 4 is a horizontal section on the line 4—4 of Fig. 3.

Grooved guiding rollers 123 are mounted upon the opposite sides of the head 114 immediately adjacent the notches 122 so as to support the wires as they pass into the notches and until they are firmly engaged by the twisters and also to guide them as possible slack therein is taken up. As shown in Fig. 4, and as will be understood, the wires engaged by the head 114 are supported by the rollers 123 in spaced relation to the head and enter the notches 122 and 121 as the head moves inwardly. The wires brought in by the carriers 94 are carried clear of the top and bottom of the head by the described rocking of said carriers and placed across the wires which are already engaged by the head, the head being consequently between the several sets of wires. When the carriers 94 are released from their wires by the tripping of the bails 101, the released wires are at once caught in and supported by the slots 121 in the twisters.

Between each pair of guide rollers 123, a stationary knife 124 is secured to and projects from the head in such position that a wire passing across and supported by the rollers 123 will be immediately under the cutting edge of the knife, and slidably mounted upon the head to cooperate with the stationary knives is a knife bar 125 equipped with a knife 126 at each end whereby if the bar be moved upwardly said knife 126 will be caused to engage the wire 56 and, cooperating with the stationary knife, will make a shear cut through the same severing it cleanly and sharply. The knife bar 125 is equipped between its ends with a projection 127 preferably carrying a roller 128 to reduce friction and said roller rests upon a cam 129 fixed on the shaft 69, as clearly shown in Fig. 7, so that when the high part of the cam 129 engages the roller 128 the knife bar will be raised and the wires cut. Also fixed upon the shaft 69 adjacent one came 129 is a latch disk 130 having a notch 131 in its periphery. Pivotally mounted upon the head adjacent said disk is a latch 132 having a wedge-shaped head 133 adapted to engage the notch 131 and thereby hold the disk and the shaft against accidental rotation and also causing it to stop after making one complete revolution, the latch being yieldably held to the disk by a spring 134, as will be understood.

From what has been said, it will be understood that the doors 53 will be opened inwardly as the respective wire carriers are moved into the baling chamber, the open position of the doors being illustrated in Figs. 3 and 4. Each door is provided with a guide or strap 135 through which pass pull bars 136 secured to and projecting inwardly from the carried 65 and the follower 92 respectively, said bars being disposed in different horizontal planes so that they will clear each other as they move inwardly, as will be understood upon reference to Fig. 3. Each pull bar passes through the strap or guide 135 on the respectively adjacent door 53 and at its inner free end is formed into a hook 137 which is adapted to engage the cooperating guide or eye 135 as the respective carrier is retracted, whereupon the door will be positively swung to the closed position and dispose the wires for another operation.

Figures 1, 18:
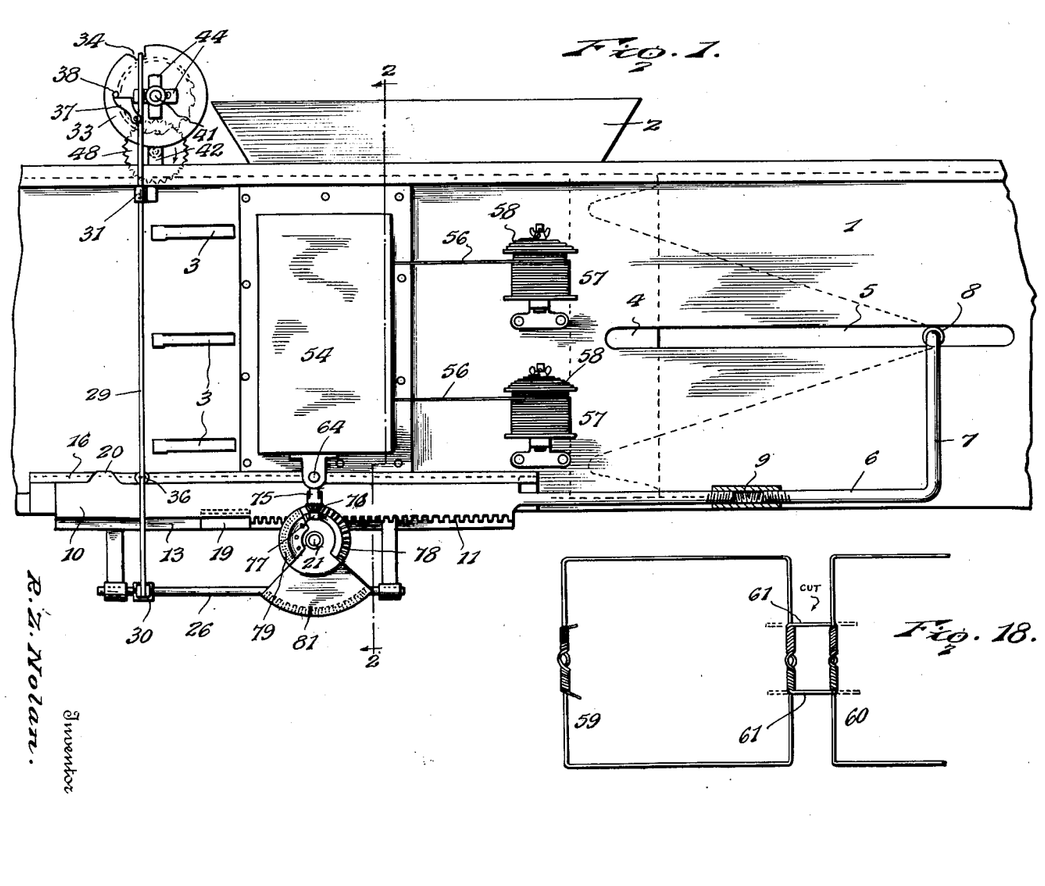
Figure 1 is a side elevation of so much of a baling press having my invention applied thereto as is necessary to an understanding of the invention.
Fig. 18 is a plan view showing the form in which the bale ties are produced.

While a bale is being formed, wires extend along the sides of the baling chamber and constitute the equivalent of the unfinished tie 60 illustrated in Fig. 18. These wires are held in horizontal planes with the respective guide rollers 123 and 113 so that as the respective carriers move inwardly said rollers will engage the wires presented thereto and carry them inwardly behind the just formed bale, as indicated in Fig. 4. As the free ends of the arms 94 approach the head 114, they will be rocked as heretofore described so that they will clear the upper and lower ends of said head and the wires carried by the rollers 113 will be caused to overlap the wires carried by said head. It will be understood that the tension devices on the reels or drums 57 will yield to permit the wires to unwind and to ride over the upper and lower corners of the head 114 so that they will be brought into the planes of the notches 122 and the tension will be restored after the wires have entered the notches 122 so that the wires will be taut and will be drawn into the grooves or slots 121 of the twisters, whereupon the rotation of the twisters will wind the overlapped strands about each other, as shown and as has been previously stated. When the twists have been finished, the knives are brought into play and will sever the wires, as has been described, and the severed ends will at once spring out of the way of the withdrawing carriers. These described successive operations are performed rapidly and with certainty and all occur during the retracting stroke of the baling plunger so that during the compressing or working stroke of the plunger the baling chamber is clear to receive a charge of hay or other material.

Considerable difficulty has been experienced in withdrawing twisted wires from twister heads, and I have found that by providing tapered projections 138 on the walls of the slots or grooves 121 the wires which have been twisted together will readily withdraw from the twisters without any breakage and without any clogging under the influence of the tension devices 58.

Having thus described the invention, I claim:

1. The combination with a baling chamber, of means for feeding tie wires into the chamber, tying the wires together and severing the ties, a vertically disposed trip rod on the side of the baling chamber arranged to shift said means into operative or inoperative position, a disk on top of the baling chamber arranged to have its periphery support said trip rod whereby the first-mentioned means will be maintained in inoperative position, said disk being provided with a peripheral notch to receive the upper end of the trip rod and permit the rod to drop and move the first-mentioned means to operative position, means controlled by the movement of material through the baling chamber to rotate said disk for releasing the trip rod, and means actuated by the trip rod for setting the disk to support the rod in raised position.

2. The combination with a baling chamber and a plunger working therein, of means controlled by the plunger for feeding tie wires thereinto, tying the wires and releasing the tied portions, a trip rod, means controlled by the trip rod for shifting the first-mentioned means into and out of operative position, means for actuating said rod at the close of an operating period of said means, a disk having a peripheral notch and adapted to peripherally engage the trip rod whereby to hold the first-mentioned means in inoperative position, a projection on said disk, a dog on the trip rod adapted to engage said projection and thereby move the disk to peripherally engage and support the rod, a star wheel actuated by the movement of material through the baling chamber, and means controlled by the star wheel for imparting movement to the disk whereby to bring the peripheral notch of the same into engagement with the trip rod and permit the first-mentioned means to return to operative position.

3. The combination with a baling chamber, and a plunger working therein, of means actuated on the retracting stroke of the plunger for feeding tie wires into the baling chamber, tying the wires and severing the same, a trip rod, means whereby to raise the trip rod as the plunger completes its retracting stroke and thereby shift the first-mentioned means into inoperative position, a disk having a notch in its periphery and adapted to peripherally engage the upper end of the trip rod to hold the same in raised position, means whereby the upward movement of the trip rod will release the same from the notch and turn the disk to peripherally support the rod, a shaft concentric with said disk and upon which the disk is loosely mounted, spring fingers carried by said shaft and frictionally engaging opposite faces of the disk, a ratchet wheel on said shaft, a star wheel mounted below said shaft and actuated by the movement of material through the baling chamber, and shiftable means on the star wheel for engaging the ratchet disk and transmitting motion to the disk for bringing the peripheral notch of the same into engagement with the trip rod.

4. The combination of a baling chamber, means for supporting tie wires along the sides of the baling chamber and across the forward end of the same, carriers disposed at opposite sides of the baling chamber, means for moving said carriers into and out of the baling chamber, means for rocking one of the carriers whereby it will clear and overlap the other carrier, and means on the last-mentioned carrier for twisting the wires and severing the same.

5. The combination of a baling chamber having openings in its sides, a plunger therein, casings extending laterally from the baling chamber around said openings, doors arranged to close the openings and swing therefrom within the baling chamber, means on said doors for supporting tie wires across the openings in the sides of the baling chamber, carriers mounted in the casings and adapted to engage the tie wires, means operated by the withdrawing stroke of the plunger for moving the carriers into and out of the baling chamber, means on one of the carriers for tying the wires and severing the same, and means on the carriers to engage the respective doors and close the same as the carriers are withdrawn from the baling chamber.

6. The combination of a baling chamber, and a plunger therein, casings extending from the opposite sides of the chamber, means for supporting tie wires at the sides of the baling chamber and at the forward end of the same, a twister head mounted in one of said casings and movable into the baling chamber to carry the wires thereinto, twist the wires and sever the same, a follower in the other casing, tracks on the sides of said casing, arms pivotally mounted on said follower and slidably engaged with said tracks and extending inwardly within the casing, means actuated by the retracting movement of the plunger to move said follower into and from the baling chamber whereby said arms will be rocked as they approach the center of the baling chamber, means at the free ends of said arms for engaging tie wires to carry them past said head, and means tripped by said head for releasing said wires and permitting them to be engaged by the twisters.

7. The combination of a baling chamber, means for supporting tie wires at the sides of the baling chamber, means at one side of the baling chamber including a head to carry the wires at said side into the chamber, twist the wires and sever the same, a follower mounted at the opposite side of the baling chamber, arms pivoted to said follower and extending toward the baling chamber therefrom, means for shifting said follower to and from the baling chamber, a bail at the free end of each of said arms, means for yieldably holding said bails in position to engage the tie wires and carry them into the baling chamber, means whereby said arms will be rocked as they approach the center of the baling chamber whereby to clear the head entering from the opposite side, and latch mechanism carried by the arms and engaging said bails and constructed to impinge said head and release the bails whereby the wires will be taken up by the head.

8. The combination of a baling chamber, means for supporting tie wires at the sides of the baling chamber and across the forward end of the same, carriers at one side of the baling chamber for carrying the wires at said side into the chamber, a head at the opposite side of the baling chamber for carrying wires at that side into the baling chamber, means actuated by the head for releasing wires from the carriers, and means carried by the head for engaging all the wires in overlapped relation at opposite sides of the head, twisting the wires together at the overlapped portions to finish one tie and start a second tie and severing the twisted wires between the ties.

9. In mechanism for the stated purpose, a head consisting of a hollow body, wire-twisting devices at the ends of the head, gearing within the head for operating said devices, said gearing including a shaft having its end projecting through the body, a stop disk on the end of said shaft having a notch in its periphery, and a latch mounted on the body and having a tapered projection adapted to engage in said notch and held constantly to the disk whereby to arrest the operation of the shaft at the end of each complete revolution.

10. In mechanism for the purpose set forth, a hollow head, wire-twisting devices at the ends of the head, means within the head for rotating said twisting devices, said means including a shaft having its end projecting through the body, stationary knives on the sides of the head adjacent the twisting devices, knife bars slidably mounted on the sides of the head, cams on said shaft, projections on the knife bars bearing on said cams whereby the knife bars will be lifted, and knives carried by the ends of the bars to cooperate with the stationary knives and sever the twisted wires, the knives on the bars being normally below the stationary bars.

11. In mechanism for the stated purpose, the combination of a working shaft, a gear loose on said shaft and having a clutch hub, a clutch member fixed on the shaft, work-performing elements fixed to the shaft, a rack bar adapted to mesh with the gear, a working plunger, connections between said rack bar and the working plunger whereby to reciprocate the bar, a flange plate secured to the side of the rack bar and projecting below the same to maintain the engagement of the rack bar and the gear, a trap door in said flange, and trip devices whereby to shift the gear through the trap door upon the completion of one stroke of the rack bar to dispose the gear behind the flange plate during the succeeding stroke of the rack bar.

12. In mechanism for the purpose set forth, a housing having a slot in its bottom, a carrier within the housing, a tie-forming element in said carrier, means for operating said element including a shaft depending from the carrier through the slot in the housing, a worm shaft below the housing, a nut on the carrier depending through the slot in the housing and engaged with said worm shaft, and means operating successively to rotate the worm shaft alternately in opposite directions and between the intervals of rotation engage and actuate the shaft depending from the carrier whereby to operate the tie-forming element.

13. In mechanism for the purpose set forth, a housing, a carrier therein, work-performing mechanism on the carrier, a shaft depending from the carrier through the housing and having a pinion on its lower end, a feed screw below the housing, a nut depending from the carrier and engaging said feed screw, gearing at the inner end of said feed screw for operating the same alternately in opposite directions and including a vertical shaft having a flat lower extremity, a compound gear including oppositely disposed segments adapted to alternately engage said pinion, a flat surface between the gears adapted to engage the flat extremity of said vertical shaft and prevent rotation thereof, and a segment arranged between the first-mentioned segments and adapted to engage the pinion on the shaft depending from the carrier while the carrier is at the inner limit of its movement.

14. The combination of a baling chamber having openings in its sides, a plunger therein, casings extending laterally from the baling chamber around said openings, doors arranged to close said openings and swing therefrom within the baling chamber, means on the doors to support tie wires across the openings, carriers in the casings adapted to engage the tie wires, means operated by the withdrawing stroke of the plunger for moving the carriers into and out of the baling chamber, means on one carrier for tying the wires and severing the same, guides on the doors, and pull bars on the carriers passing through said guides and having hooks at their ends to engage the guides whereby the doors will be positively closed as the carriers move from the baling chamber.

15. The combination of a baling chamber, a plunger therein, means for supporting tie wires at the sides of the baling chamber and at the forward end of the same, a head mounted at one side of the baling chamber and movable into and out of said chamber to carry wires thereinto, means on the head to twist and sever the wires, and means at the opposite side of the baling chamber to carry wires into the chamber, said last named means including arms and means for rocking said arms, rocking bails pivotally mounted on the inner ends of said arms to engage and support the wires, means tending constantly to rock the bails to release the wires, bolts mounted on the arms and holding the bails in wire-supporting position, and triggers depending from the bolts in position to be actuated by the head to release the bolts.

In testimony whereof I affix my signature.

RUDOLPH Z. NOLAN.